US012657606B2

(12) United States Patent
Choi

(10) Patent No.: US 12,657,606 B2
(45) Date of Patent: Jun. 16, 2026

(54) INFORMATION PROVISION SYSTEM AND METHOD

(71) Applicants: Hyundai Motor Company, Seoul (KR); Kia Corporation, Seoul (KR)

(72) Inventor: Min Seok Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/651,302

(22) Filed: Apr. 30, 2024

(65) Prior Publication Data

US 2025/0166013 A1 May 22, 2025

(30) Foreign Application Priority Data

Nov. 21, 2023 (KR) ........................ 10-2023-0162478

(51) Int. Cl.
*G06Q 30/02* (2023.01)
*G06Q 30/0251* (2023.01)

(52) U.S. Cl.
CPC ................................ *G06Q 30/0266* (2013.01)

(58) Field of Classification Search
CPC ........ G06Q 30/0266; G06Q 30/0207–30/0277
See application file for complete search history.

(56) References Cited

U.S. PATENT DOCUMENTS

| | | | | | |
|---|---|---|---|---|---|
| 7,135,993 | B2 * | 11/2006 | Okamoto | ........... | G01C 21/3697 |
| | | | | | 701/1 |
| 7,365,651 | B2 * | 4/2008 | Massey | .................... | A61B 5/18 |
| | | | | | 701/1 |
| 9,082,239 | B2 * | 7/2015 | Ricci | ........................ | G06F 21/00 |
| 9,240,018 | B2 * | 1/2016 | Ricci | ........................ | G06F 3/017 |
| 2005/0024189 | A1 * | 2/2005 | Weber | .................... | G06Q 30/02 |
| | | | | | 340/425.5 |
| 2009/0299857 | A1 * | 12/2009 | Brubaker | ............... | G06Q 30/02 |
| | | | | | 455/99 |
| 2010/0293033 | A1 * | 11/2010 | Hall | ........................ | G06Q 30/02 |
| | | | | | 705/14.1 |
| 2013/0030645 | A1 * | 1/2013 | Divine | .................. | B60K 35/00 |
| | | | | | 709/217 |
| 2013/0054132 | A1 * | 2/2013 | Conner | .............. | G01C 21/3407 |
| | | | | | 701/411 |
| 2013/0066720 | A1 * | 3/2013 | Schwarz | ............... | G06Q 30/02 |
| | | | | | 340/901 |
| 2013/0132172 | A1 * | 5/2013 | Liu | ........................ | G06Q 30/02 |
| | | | | | 705/14.62 |
| 2014/0310103 | A1 * | 10/2014 | Ricci | .................... | G08B 25/016 |
| | | | | | 705/14.62 |
| 2017/0277397 | A1 * | 9/2017 | Ishibashi | ............. | G06F 3/04817 |
| 2019/0050904 | A1 * | 2/2019 | Wasserman | .......... | G08G 1/0116 |
| 2019/0265948 | A1 * | 8/2019 | Goyal | .................. | H04L 67/306 |

(Continued)

FOREIGN PATENT DOCUMENTS

KR 2013-0066239 A * 12/2011

*Primary Examiner* — Thuy N Nguyen
(74) *Attorney, Agent, or Firm* — MORGAN, LEWIS & BOCKIUS LLP

(57) ABSTRACT

An information provision system includes a controller configured to determine an occupant on board a vehicle per seat and control the output of advertising information related to a point of interest based on the per-seat occupant and a driving time of the vehicle, and an output device operatively connected to the controller and configured to output the advertising information.

20 Claims, 3 Drawing Sheets

(56)     References Cited

U.S. PATENT DOCUMENTS

| | | | |
|---|---|---|---|
| 2022/0111765 A1* | 4/2022 | Kaku | ..................... G09F 19/00 |
| 2022/0224963 A1* | 7/2022 | Herz | ..................... G06Q 50/40 |
| 2023/0056582 A1* | 2/2023 | Pak | ..................... B60W 40/08 |
| 2023/0273043 A1* | 8/2023 | Nishiyama | ......... G01C 21/3461 |
| | | | 701/426 |

* cited by examiner

INFORMATION PROVISION SYSTEM AND METHOD

CROSS REFERENCE TO RELATED APPLICATION

The present application claims priority to Korean Patent Application No. 10-2023-0162478, filed Nov. 21, 2023, the entire contents of which is incorporated herein for all purposes by this reference.

BACKGROUND OF THE PRESENT DISCLOSURE

Field of the Present Disclosure

The present disclosure relates to an information provision system and method for providing specific information to users of a vehicle.

Description of Related Art

The existing navigation systems built into vehicles use data received from Global Positioning System (GPS) satellites to display information on the current location and direction of travel of the vehicle on the display and offer information on the preferred roads, distances, and estimated time of travel in response to the entry of the departure point and destination point.

Additionally, navigation systems may receive real-time traffic information and preset optimal distance or road priorities based on the received traffic information along with the current vehicle position and internally stored map information, enabling the service to provide users searching for a route with information on searched routes based on the preset criteria. However, navigation systems can offer users with not only route guidance but also various functions such as radio, media, and location-sharing capabilities.

Recently, as the time users spend in vehicles increases, navigation systems are evolving to incorporate features or services to enhance user convenience. Such features or services feasible with navigation systems may include the provision of advertising information tailored to the user's interest.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an information provision system and method capable of determining information related to each occupant in a vehicle per seat and providing advertising information related to points of interest based on the determined occupant information and driving time.

The technical objects of the present disclosure are not limited to the aforesaid, and other objects not described herein with be clearly understood by those skilled in the art from the descriptions below.

In various aspects of the present disclosure, an information provision system according to an exemplary embodiment of the present disclosure may include a controller configured to determine an occupant on board a vehicle per seat and control an output of advertising information related to a point of interest determined based on the per-seat occupant and a driving time of the vehicle, and an output device operatively connected to the controller and configured to output the advertising information.

For example, the controller may be configured to determine whether the occupant is on board the vehicle using at least one of a recognition device and a wireless communication device provided with the vehicle and operatively connected to the controller.

For example, the controller may be configured to determine detailed information related to the occupant based on the occupant being determined on board the vehicle and control the advertising information determined based on the determined detailed information and the driving time to be output.

For example, the detailed information may include at least one of the gender and age group of the occupant.

For example, the controller may distinguish, based on the occupant being determined, between a vehicle driver and at least one passenger and determine the detailed information related to each of the vehicle driver and the at least one passenger.

For example, the controller may distinguish the vehicle driver and the at least one passenger using a recognition device provided in the vehicle.

For example, the controller may be configured to determine the detailed information related to the vehicle driver based on personal setting information stored in the vehicle and determine the detailed information related to the at least one passenger based on at least one of a location of the seat occupied by the at least one passenger and a weight of the at least one passenger that are based on recognition information from a recognition device.

For example, the controller may be configured to transmit the determined detailed information to a server configured for mutual communication therebetween, receive the information related to the point of interest determined based on the detailed information and the driving time from the server, and control the output device to output the received information.

For example, the controller is configured to receive the information related to the point of interest determined based on the detailed information related to the at least one passenger and the driving time from the server.

For example, the controller may store, upon one of the point of interest being selected by the occupant based on the output advertising information, the advertisement information related to the selected point of interest in association with the occupant.

In order In various aspects of the present disclosure, an information provision method according to an exemplary embodiment of the present disclosure may include determining whether an occupant is on board a vehicle per seat, obtaining, based on an occupant being on board the vehicle, advertising information related to a point of interest determined based on the occupant and the driving time of the vehicle, and outputting the obtained advertising information.

For example, the determining may include determining whether an occupant is on board the vehicle using at least one of a recognition device and a wireless communication device provided with the vehicle and operatively connected to the controller.

For example, the obtaining may include determining detailed information related to the occupant based on the occupant being on board the vehicle, and obtaining the advertising information determined based on the detailed information and the driving time.

For example, the detailed information may include at least one of the gender and age group of the occupant.

For example, the determining of the detailed information may include distinguishing, based on the occupant being determined, between a vehicle driver and at least one passenger, and determining the detailed information related to each of the vehicle driver and the at least one passenger.

For example, the distinguishing may include distinguishing the vehicle driver and the at least one passenger using a recognition device provided in the vehicle.

For example, the determining of the detailed information may include determining the detailed information related to the vehicle driver based on personal setting information stored in the vehicle, and determining the detailed information related to the at least one passenger based on at least one of a location of the seat occupied by the at least one passenger and a weight of the at least one passenger that are based on recognition information from a recognition device.

For example, the obtaining may include transmitting the determined detailed information to a server configured for mutual communication therebetween, and receiving the information related to the point of interest determined based on the detailed information and the driving time from the server.

For example, the obtaining may include obtaining the information related to the point of interest determined based on the detailed information related to the at least one passenger and the driving time.

For example, the information provision method may further include, after the outputting, storing, upon one of the point of interest being selected by the occupant based on the output advertising information, the advertisement information related to the selected point of interest in association with the occupant.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
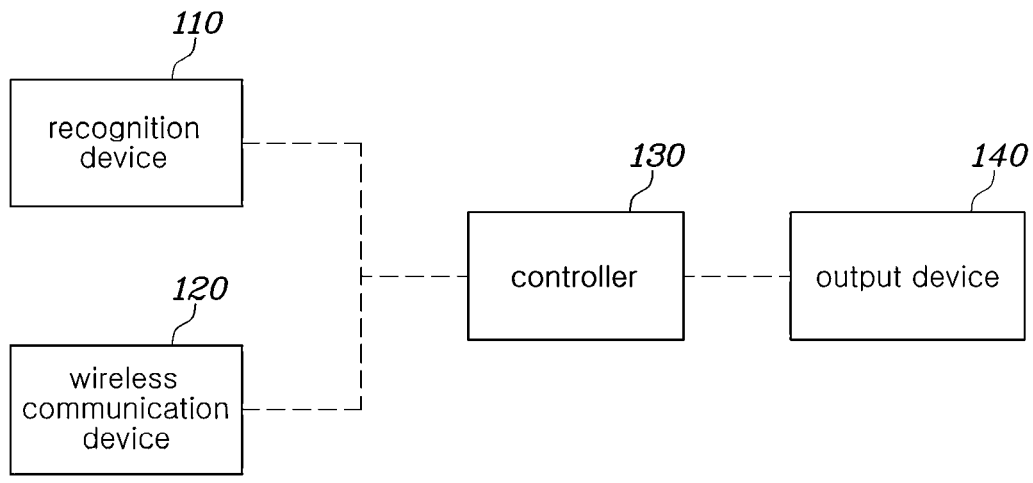
FIG. 1 is a block diagram illustrating a configuration of an information provision system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Furthermore, detailed descriptions of well-known technologies related to the exemplary embodiments disclosed in the present specification may be omitted to avoid obscuring the subject matter of the exemplary embodiments disclosed in the present specification. Furthermore, the accompanying drawings are only for easy understanding of the exemplary embodiments disclosed in the present specification and do not limit the technical spirit disclosed herein, and it should be understood that the exemplary embodiments include all changes, equivalents, and substitutes within the spirit and scope of the present disclosure.

As used herein, terms including an ordinal number such as "first" and "second" may be used to describe various components without limiting the components. The terms are used only for distinguishing one component from another component.

It will be understood that when a component is referred to as being "connected to" or "coupled to" another component, it may be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

Hereinafter, descriptions are made of the exemplary embodiments disclosed in the present specification with reference to the accompanying drawings in which the same reference numbers are assigned to refer to the same or like components and redundant description thereof is omitted.

Firstly, the present disclosure aims to provide advertising information related to points of interest for occupants on board a vehicle based on information related to the occupants and driving time of the vehicle. In the exemplary embodiments of the present disclosure to be described hereinafter, it is assumed that vehicle occupants include the vehicle driver and passengers, with a focus on providing advertising information related to points of interest related to vehicle occupants, based on the information related to the passengers and the driving time of the vehicle.

A description includes the information provision system according to an exemplary embodiment of the present disclosure with reference to FIG. 1.

FIG. 1 is a block diagram illustrating a configuration of an information provision system according to an exemplary embodiment of the present disclosure.

With reference to FIG. 1, the information provision system according to an exemplary embodiment of the present disclosure may include a recognition device 110, a wireless communication device 120, a controller 130, and an output device 140. FIG. 1 merely shows the components essential to the description of an exemplary embodiment of the present disclosure, and actual implementation may include more or fewer components.

Hereinafter, descriptions are made of individual components.

The recognition device 110 is provided in a vehicle, particularly, in the interior space of the vehicle. For example, the recognition device 110 may include sensors such as cameras, radio detection and ranging (RADAR)s, and seat sensors provided in the internal space of the vehicle. However, this is illustrative and the actual implementation is not limited thereto.

The wireless communication device 120 is provided in the vehicle and may include a communication device with Bluetooth or Wi-Fi functionality to communicate with passengers' mobile devices or a communication device that recognizes passengers' smart keys. However, this is illustrative and the actual implementation is not limited thereto.

According to an exemplary embodiment of the present disclosure, the recognition device 110 and the wireless communication device 120 may each transmit detected or recognized information to the controller 130.

According to an exemplary embodiment of the present disclosure, the controller 130 may be configured to determine whether an occupant is on board, and control the output of advertising information related to the points of interest related to the occupant based on the occupant being on board. More detailed description is made with reference to FIG. 2

Meanwhile, according to an exemplary embodiment of the present disclosure, the controller 130 may be implemented as one of the functions of an audio/video/navigation (AVN) controller that is configured to control the Audio, Video and Navigation (AVN) system provided in the vehicle. However, this is illustrative and the actual implementation is not limited thereto. For example, the controller 130 may be implemented as a separate controller from the AVN controller, or its functions may be distributed across two or more different controllers.

Figure 2:
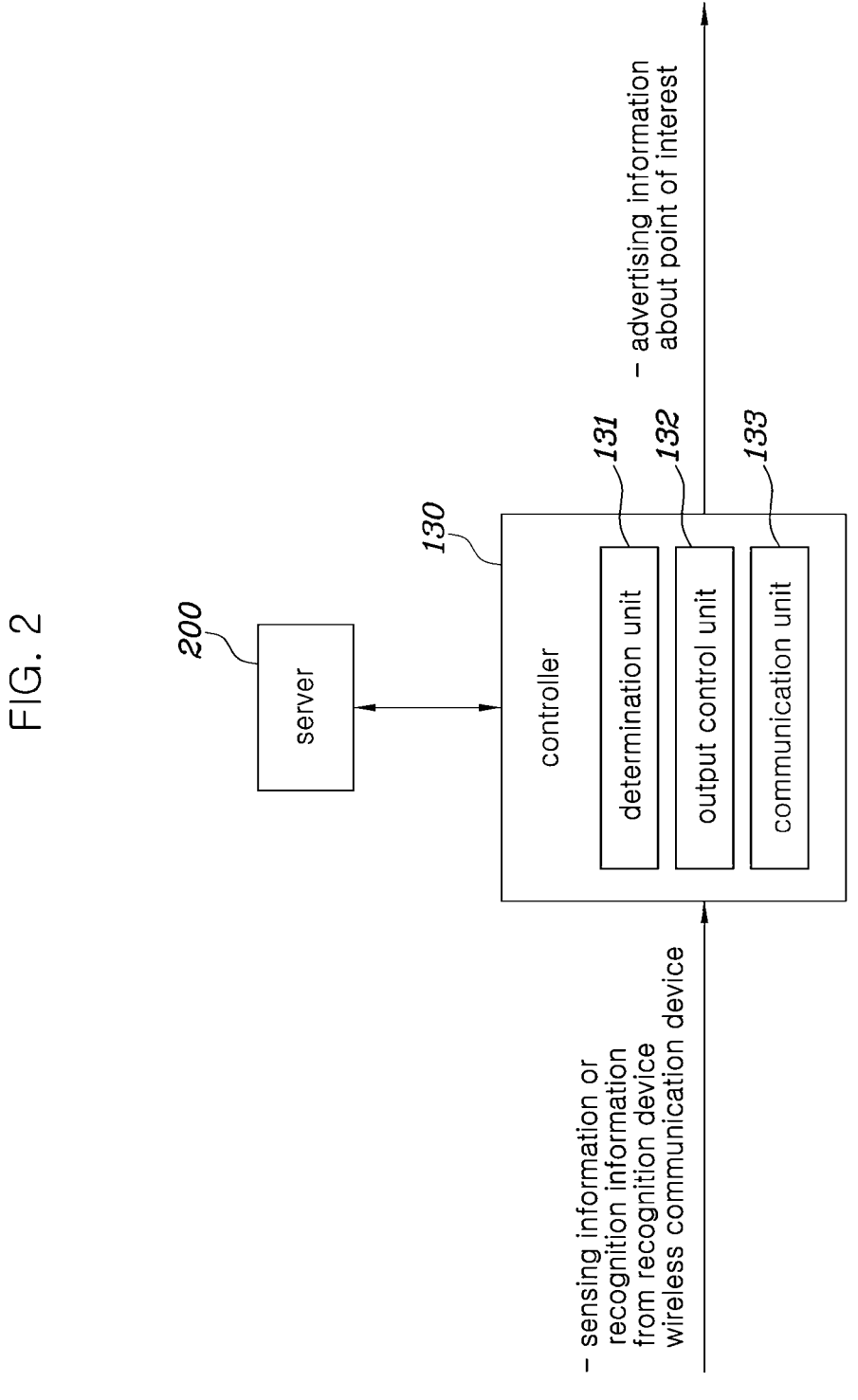
FIG. 2 is a block diagram illustrating operations of a controller according to an exemplary embodiment of the present disclosure.

FIG. 2 is a block diagram illustrating operations of a controller according to an exemplary embodiment of the present disclosure.

With reference to FIG. 2, the controller 130 according to an exemplary embodiment of the present disclosure may include a determination unit 131, an output control unit 132, and a communication unit 133. The drawing merely shows the components essentially related to the operation of the controller 130 according to an exemplary embodiment of the present disclosure, and actual implementation may include more or fewer components.

Hereinafter, descriptions are made of individual components.

The determination unit 131 may be configured to determine whether an occupant is on board the vehicle per seat. In detail, the determination unit 131 may be configured to determine whether an occupant is on board the vehicle per seat based on at least one of the recognition device 110 and the wireless communication device 120. The determination unit 131 may receive detected or recognized information from at least one of the recognition device 110 and the wireless communication device 120 and determine whether an occupant is on board the vehicle based on the received information.

The determination unit 131 may be configured to determine whether an occupant is on board the vehicle per seat and provide the determination result to the output control unit 132.

Upon confirmation of the occupant being on board the vehicle based on the determination result, the output control unit 132 may be configured for controlling the output of advertising information related to points of interest based on the vehicle occupants and the driving time of the vehicle.

In detail, based on the occupant being on board the vehicle, the output control unit 132 may be configured to determine detailed information related to the occupant. Here, the detailed information related to the vehicle occupant may include information related to at least one of the gender and age group of the occupant. However, this is illustrative and the actual implementation is not limited thereto.

Meanwhile, upon detection of the occupant being on board the vehicle, the output control unit 132 may distinguish between the vehicle driver and at least one passenger, for example, using the recognition device 110.

Accordingly, the output control unit 132 may be configured to determine detailed information related to each of the vehicle driver and at least one passenger.

In detail, the output control unit 132 may be configured to determine detailed information related to the vehicle driver based on the personal setting information stored in the vehicle. In the instant case, the personal setting information may be stored in a separately provided memory in association with the vehicle driver, and for example, the personal setting information may represent an individual profile. However, this is illustrative and the actual implementation is not limited thereto.

The output control unit 132 may also determine detailed information related to at least one passenger using the recognition device 110 provided in the vehicle. The output control unit 132 may receive recognition information from the recognition device 110, and based on the provided recognition information, determine information related to the location of the seat where at least one passenger is seated and information related to at least one of the weight of at least one passenger. The output control unit 132 may also determine detailed information related to the at least one passenger based on the at least one piece of determined information.

According to an exemplary embodiment of the present disclosure, the output control unit 132 may be configured to determine detailed information related to the at least one passenger by combining information related to the location of the seat where the at least one passenger is seated and weight information related to at least one passenger.

For example, the output control unit 132 may be configured to determine that at least one passenger is a child, based on the determined information indicative of a passenger occupying a rear seat and weighing less than 40 kg. The output control unit 132 may also determine that at least one passenger is an adult female, based on the determined information indicative of a passenger occupying the front passenger seat or a rear seat while weighing 40 kg or more and less than 60 kg. The output control unit 132 may also determine that at least one passenger is an adult male, based on the determined information indicative of a passenger occupying the front passenger seat or a rear seat while weighing 65 kg or more. However, this is illustrative and the actual implementation is not limited thereto. For example, the mentioned values may vary depending on the recognition sensitivity of the recognition device 110 and the determination accuracy of the output control unit 132 or the controller 130.

The output control unit 132 may also control the output of advertising information, based on the determined detailed information related to the vehicle occupants and the driving time of the vehicle. In the instant case, the output control unit 132 may transmit the determined information related to the vehicle occupants to a server 200 located outside the information provision system and receive the advertising information determined based on detailed information related to the vehicle occupants and driving time from the server 200.

To achieve this, the output control unit 132 may send the detailed information related to the determined vehicle occupants to the communication unit 133. The communication unit 133, configured for communicating with the server 200, may transmit the detailed information related to the determined vehicle occupants, received from the output control unit 132, to the server 200.

Here, the server 200 may include a communication device that communicates with the controller 130 or the communication unit 133 to perform its assigned function, a memory that stores operating systems, logic instructions, and input/output information, and one or more processors that perform determination, computation, decision-making, and other tasks required for controlling the assigned functions. For example, the server 200 may represent a vehicle server that provides various information, functions, and services related to the vehicle, but this is illustrative not necessarily limited to the example.

The server 200 may be configured to determine advertising information related to points of interest for vehicle occupants based on the detailed information related to the vehicle occupants and driving time transmitted through the communication unit 133. In the instant case, the driving time may refer to the time period during which the vehicle is in operation with the occupants on board or the time period during which detailed information related to the vehicle occupants is received from the communication unit 133. For example, the driving time may refer to the commuting hours, school hours, lunchtime, and evening hours, but this is only illustrative and not necessarily limited to these examples.

The server 200 may also determine advertising information related to points of interest for vehicle occupants based on the detailed information related to at least one passenger and the driving time transmitted through the communication unit 133.

Subsequently, the server 200 may transmit the advertising information related to points of interest determined for the vehicle occupants back to the communication unit 133, and the communication unit 133 may send the advertising information related to points of interest for the vehicle occupants, received from the server 200, to the output control unit 132.

That is, the output control unit 132 may receive the advertising information related to points of interest for the vehicle occupants, determined by the server 200, through the communication unit 133 and control the output of received advertising information related to points of interest for the vehicle occupants.

Here, for example, the points of interest for the vehicle occupants may be restaurants or cafes, and the advertising information related to these points of interest may include menu details for food or drinks sold at those places or information related to whether the corresponding places have facilities for children's activities.

For example, the advertising information related to points of interest may include details about restaurants, such as those with play areas or kids' menus for vehicle occupants with children during mealtime, or such as those offering food catering to the preferences of adult males (e.g., soups, meats, stews, and Chinese cuisine) or known for quick service for vehicle occupants consisting of adult males during mealtime. As an exemplary embodiment of the present disclosure, for the vehicle occupants consisting only of adult females during mealtime, the advertising information may include details about restaurants offering food catering to the preferences of adult females (such as brunch menus, Western cuisine, and Japanese cuisine). That is, the advertising information related to points of interest may vary depending on the vehicle occupants or the driving time of the vehicle. However, this is illustrative and the actual implementation is not limited thereto.

With reference to FIG. 1 again, the controller 130 according to an exemplary embodiment of the present disclosure may be configured to determine whether an occupant is on board the vehicle per seat, and control the output of advertising information related to the occupant-specific points of interest, based on the occupant being on board.

That is, the controller 130 may transmit advertising information related to the occupant-specific points of interest to the output device 140 provided in the vehicle, and the output device 140 may display the advertising information received from the controller 130. In the instant case, the output device 140 may output the advertising information to the vehicle occupant.

For example, the output device 140 may be a display device provided in the vehicle that visually and audibly presents the advertising information. The display device may be implemented as a cluster, head-up display (HUD), or the display of an audio/video/navigation (AVN) system. However, this is illustrative, and the output device 140 may be implemented in various ways beyond the mentioned devices.

Moreover, when the output device 140 is a navigation system provided in the vehicle, the output device 140 may display advertising information related to the points of interest for the vehicle occupants on the map provided in the navigation. The output device 140 may display brand pins at the location of points of interest, and advertising information related to these points of interest may be linked to the corresponding location information to be displayed in a pop-up format at the corresponding brand pins. However, this is illustrative and the actual implementation is not limited thereto.

Meanwhile, the vehicle occupant may select a point of interest corresponding to one of the advertising information displayed on the output device 140. In the instant case, the controller 130 may collect advertising information for the point of interest selected by the vehicle occupant and store the advertising information related to the selected point of interest in an occupant-specific manner.

This makes it possible, when the occupant on board the vehicle later is identified as the one corresponding to the stored advertising information, to provide the advertising information tailored to the vehicle occupant in a quick and accurate manner.

Hereinafter, a description includes the information provision method according to an exemplary embodiment of the present disclosure with reference to FIG. 3, based on the configuration of the information provision system described with reference to FIG. 1 and FIG. 2. Detailed descriptions of individual steps which may be replaced with those made with reference to FIG. 1 and FIG. 2 will be omitted.

Furthermore, for the convenience of the explanation, it is assumed that each operation is collectively performed by the controller 130.

Figure 3:
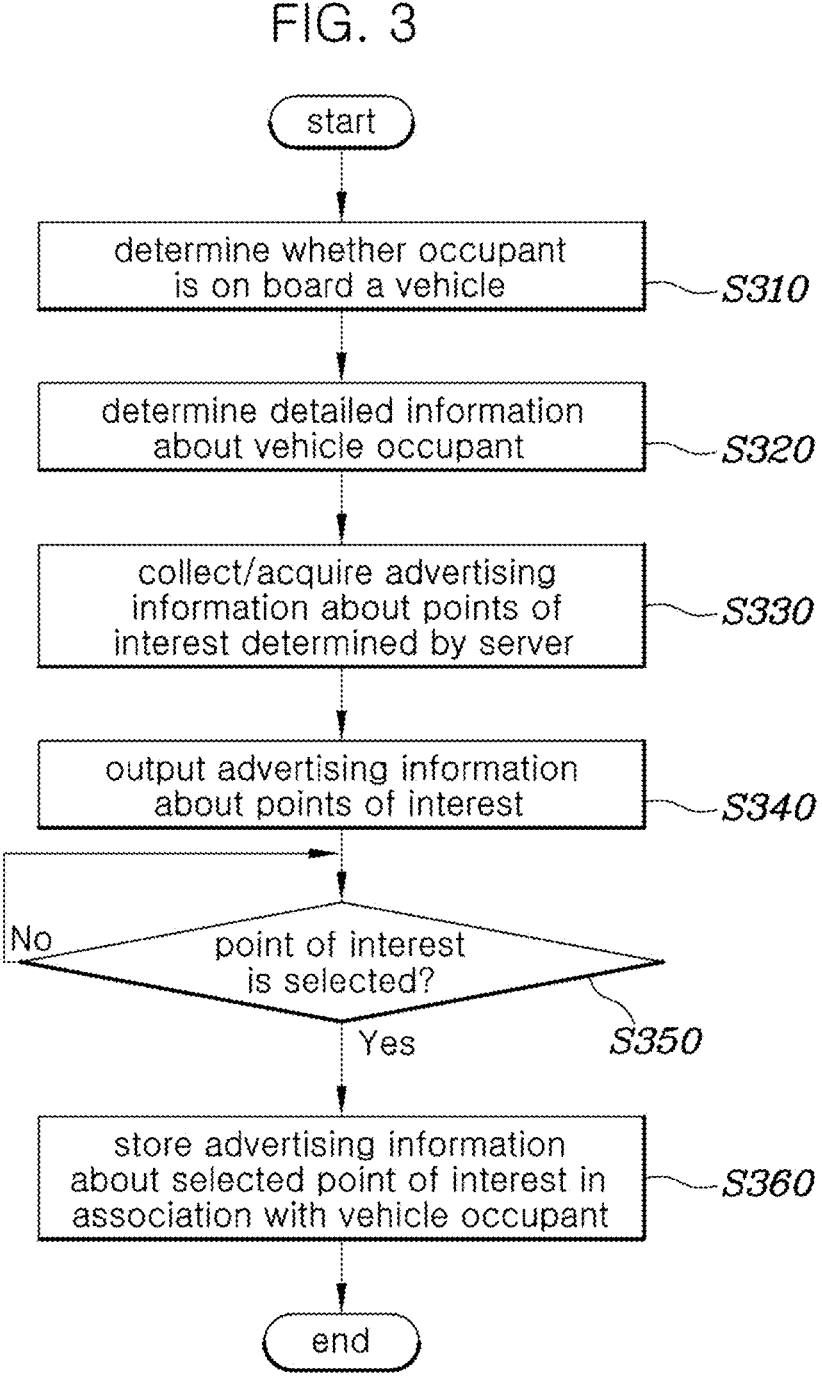
FIG. 3 is a flowchart illustrating an information provision method according to an exemplary embodiment of the present disclosure.

FIG. 3 is a flowchart illustrating an information provision method according to an exemplary embodiment of the present disclosure.

With reference to FIG. 3, the controller 130 may be configured to determine at step S310 whether an occupant is on board the vehicle based on at least one of the recognition device 110 and the wireless communication device 120 provided in the vehicle.

Based on an occupant being on board the vehicle, the controller 130 may be configured to determine detailed information related to the vehicle occupant at step S320 and collect or obtain advertising information related to points of interest for the determined vehicle occupant based on detailed information and driving time obtained from the server 200 at step S330.

Next, the controller 130 may be configured for controlling the output of the collected or obtained advertising information related to points of interest for the vehicle occupant to be displayed through the output device 140 at step S340.

Afterward, upon the vehicle occupant selecting one of the points of interest being selected based on the advertising information related to points of interest displayed on the output device 140 (Yes at step S350), the controller 130 may store the advertising information related to the selected point of interest in association with the vehicle occupant at step S360.

As described above, the information provision apparatus and method of the present disclosure is advantageous in terms of providing advertising information tailored to a passenger, even when information related to the passenger is not pre-stored, by determining information related to the passenger using a recognition device provided in the vehicle.

Furthermore, the advertising information may be provided in a manner specific to each occupant, enhancing accuracy and deliver speed, by storing advertising information related to the points of interests selected by the driver and passengers in an occupant-specific manner.

Although the present disclosure has been illustrated and described in connection with specific embodiments, it will be obvious to those skilled in the art that various modification and changes may be made thereto without departing from the spirit of the present disclosure or the scope of the appended claims.

Meanwhile, the present disclosure described above may be implemented as computer-readable codes on a medium on which a program is recorded. Computer-readable media include all types of recording devices in which data readable by a computer system are stored. Examples of the computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects but as exemplary. The scope of the present disclosure should be determined by a reasonable interpretation of the appended claims and includes all modifications within the equivalent scope of the present disclosure.

As described above, the information provision apparatus and method of the present disclosure is advantageous in terms of providing advertising information tailored to a passenger, even when information related to the passenger is not pre-stored, by determining information related to the passenger using a recognition device provided in the vehicle.

Furthermore, the advertising information may be provided in a manner specific to each occupant, enhancing accuracy and deliver speed, by storing advertising information related to the points of interests selected by the driver and passengers in an occupant-specific manner.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/of" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An information provision system comprising:
   a controller configured to determine an occupant on board a vehicle per seat and control an output of advertising information related to a point of interest determined based on the per-seat occupant and a driving time of the vehicle; and
   an output device operatively connected to the controller and configured to output the advertising information,
   wherein the system further comprises a recognition device including a seat sensor,
   wherein the controller receives information including location of the seat where at least one occupant is seated and a weight of the at least one occupant from the recognition device,
   wherein the controller determines a classification including child, adult male and adult female of the occupant based on the received information,
   wherein the controller controls the output device to output the advertising information based on the determined classification of the occupant,
   wherein the output device includes Audio/Video/Navigation (AVN) device provided in the vehicle,
   wherein the AVN device displays a brand pin at a location of points of interests on a map provided in a navigation of the AVN and displays the advertising information related to the points of interests in a pop-up format on a corresponding brand pin, and
   wherein the advertising information includes offered items of a corresponding point of interest.

2. The information provision system of claim 1, wherein the controller is further configured to determine whether the occupant is on board the vehicle using at least one of the recognition device and a wireless communication device provided with the vehicle and operatively connected to the controller.

3. The information provision system of claim 1, wherein the controller is further configured to determine information related to the occupant including the classification upon concluding that the occupant is on board the vehicle and is configured to control the advertising information determined based on the determined information related to the occupant and the driving time to be output.

4. The information provision system of claim 3, wherein the information related to the occupant includes at least one of gender and age group of the occupant.

5. The information provision system of claim 3, wherein the controller is further configured for distinguishing, based on the occupant being determined, between a vehicle driver and at least one passenger and is further configured to determine the information related to each of the vehicle driver and the at least one passenger.

6. The information provision system of claim 5, wherein the controller is further configured for distinguishing the vehicle driver and the at least one passenger using the recognition device provided in the vehicle and operatively connected to the controller.

7. The information provision system of claim 5, wherein the controller is further configured to determine the information related to the vehicle driver based on personal setting information stored in the vehicle and is further configured to determine the information related to the at least one passenger based on the received information from the recognition device.

8. The information provision system of claim 3, wherein the controller is further configured for transmitting the determined information to a server configured for mutual communication with the controller, to receive the advertising information related to the point of interest determined based on the information related to the occupant and the driving time from the server, and to control the output device to output the received advertising information related to the point of interest.

9. The information provision system of claim 8, wherein the controller is further configured to receive the advertising information related to the point of interest determined based on the information related to the at least one passenger and the driving time from the server.

10. The information provision system of claim 1, wherein the controller is further configured to store, upon one of the point of interest being selected by the occupant based on the output advertising information, the advertisement information related to the selected point of interest in association with the occupant.

11. An information provision method comprising:

determining, by a controller, whether an occupant is on board a vehicle per seat;

obtaining, by the controller, based on the occupant being on board the vehicle, advertising information related to a point of interest determined based on the occupant and a driving time of the vehicle; and outputting, by the controller, the obtained advertising information, wherein the method further comprises:

recognizing, by a recognition device including a seat sensor;

receiving, by the controller, information including location of the seat where at least one occupant is seated and a weight of at least one occupant from the recognition device;

determining a classification including child, adult male and adult female of the occupant based on the received information, wherein the outputting includes controlling, by the controller, the output device to output the advertising information based on the determined classification of the occupant, wherein the output device includes Audio/Video/Navigation (AVN) device provided in the vehicle, wherein the outputting includes displaying a brand pin at a location of points of interests on a map provided in the navigation of the AVN and displaying the advertising information related to the points of interests in a pop-up format on a corresponding brand pin, and wherein the advertising information includes offered items of a corresponding point of interest.

12. The information provision method of claim 11, wherein the determining includes determining whether the occupant is on board the vehicle using at least one of the recognition device and a wireless communication device provided with the vehicle and operatively connected to the controller.

13. The information provision method of claim 11, wherein the obtaining includes:

determining information related to the occupant including the classification based on the occupant being on board the vehicle; and obtaining the advertising information determined based on the information related to the occupant and the driving time.

14. The information provision method of claim 13, wherein the information related to the occupant includes at least one of gender and age group of the occupant.

15. The information provision method of claim 13, wherein the determining of the information related to the occupant includes:

distinguishing, based on the occupant being determined, between a vehicle driver and at least one passenger; and determining the information related to each of the vehicle driver and the at least one passenger.

16. The information provision method of claim 15, wherein the distinguishing includes distinguishing the vehicle driver and the at least one passenger using the recognition device.

17. The information provision method of claim 15, wherein the determining of the information related to the occupant includes:

determining the information related to the vehicle driver based on personal setting information stored in the vehicle; and determining the information related to the at least one passenger based on the received information from the recognition device.

18. The information provision method of claim 13, wherein the obtaining includes:

transmitting the determined information related to the occupant to a server configured for mutual communication with the controller; and receiving the advertising information related to the point of interest determined based on the information related to the occupant and the driving time from the server.

19. The information provision method of claim 18, wherein the obtaining includes obtaining the advertising information related to the point of interest determined based on the information related to the at least one passenger and the driving time.

20. The information provision method of claim 11, further including:

after the outputting, storing, by the controller, upon one of the point of interest being selected by the occupant based on the output advertising information, the advertisement information related to the selected point of interest in association with the occupant.

* * * * *